United States Patent Office 3,108,308
Patented Oct. 29, 1963

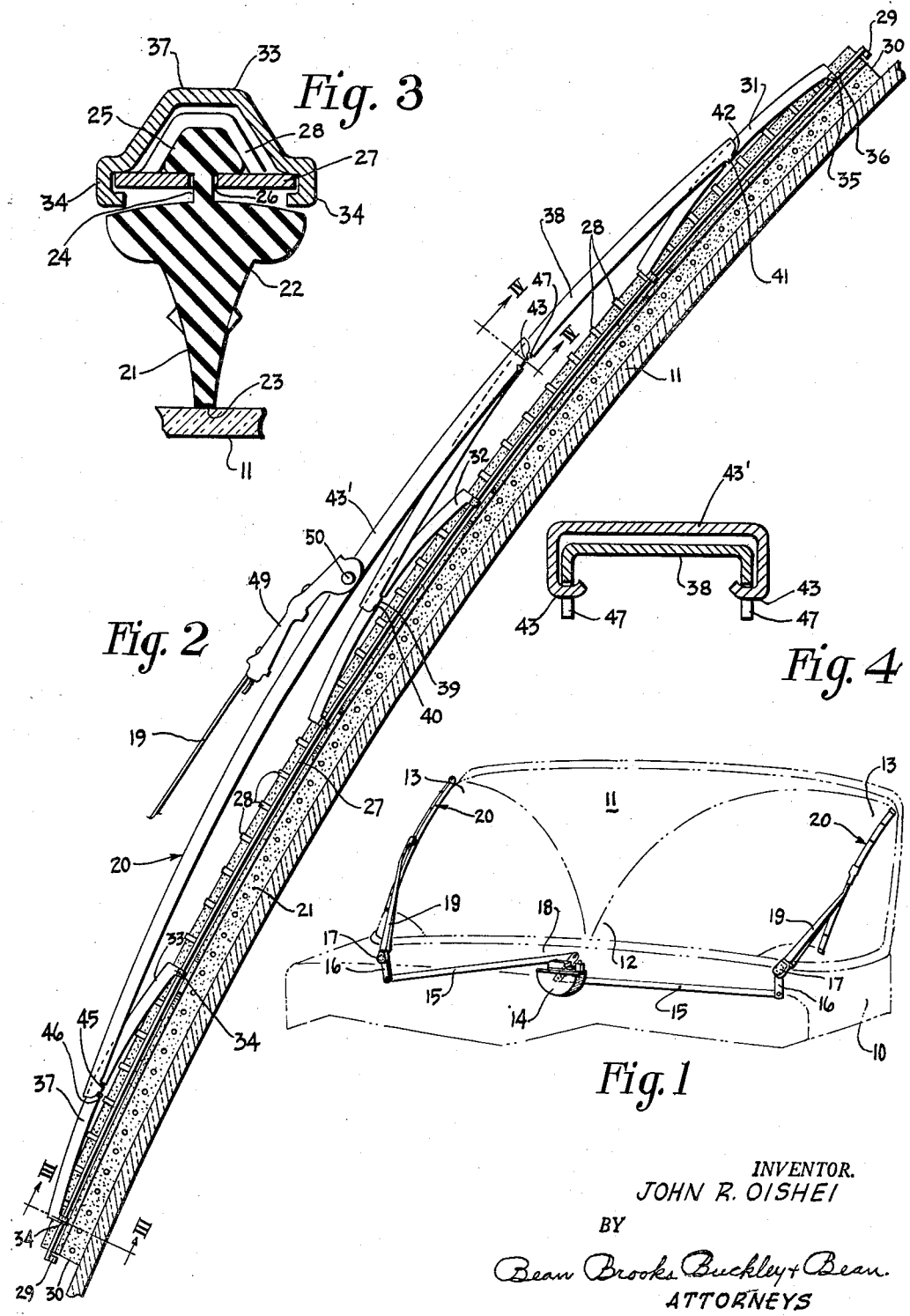

3,108,308
WINDSHIELD WIPER
John R. Oishei, Buffalo, N.Y., assignor to Trico Products
Corporation, Buffalo, N.Y.
Filed Dec. 6, 1960, Ser. No. 74,107
5 Claims. (Cl. 15—250.42)

The present invention relates to windshield wipers and more particularly to wipers for curved windshields.

Curved windshields of present day design are extremely long from top to bottom, thereby requiring wipers which are also long. In addition these windshields possess a relatively flat frontal area and lateral areas which are more curved. Wipers for cleaning windshields of the above-described type must have sufficient flexibility for wiping the relatively curved areas of the windshield and in addition must have a sufficient number of areas along the length thereof at which the wiper arm pressure is effectively exerted on the squeegee or wiping element to maintain it in good wiping contact with the windishield and to prevent the backing strip from distorting laterally as a result of the frictional force exerted thereon when the wiper is traversing the windshield. In addition it is very important that the silhouette of the wiper be relatively low, especially in view of its increased length, to thereby provide relatively little area for impingement of air currents which would tend to lift it from the windshield.

It is accordingly the object of the present invention to provide an improved elongated wiper which has increased flexibility in those portions thereof which are adapted to traverse the more severely curved portions of the windshield notwithstanding that the wiper has more areas of support to prevent it from distorting laterally due to its increased length. Other objects and attendant advantages of the present invention will readily be perceived hereafter.

The wiper of the present invention achieves the foregoing object by utilizing an arrangement of pressure equalizers mounted at select spaced portions on the backing strip which mounts the wiping element, thereby providing six areas of pressure distribution and support against lateral distortion. An intermediate pressure equalizer is pivotally mounted between the ends of the two outer pressure equalizers and in turn pivotally mounts the outer end of a lever which in turn mounts the wiper arm attaching clip. The inner or lowermost end of the lever is in turn pivotally mounted on a third pressure equalizer. Because of the pivotal connection between the intermediate pressure equalizer and the outer end of the lever and because of the pivotal connections between the outer two pressure equalizers and the intermediate pressure equalizer, a floating action is obtained which permits the wiper to readily conform to the more curved lateral areas of the windshield. Furthermore, the distribution of wiper arm pressure to six longitudinally spaced areas on the backing strip provides the pressure distribution which is required to maintain the wiping element of an elongated wiper in good wiping contact with all portions of the windshield which it traverses. Moreover, all of the pressure equalizers and the lever are made so that they can nest within each other to thereby provide a relatively low silhouette to prevent lifting of the wiper blade from the windshield by air currents at high vehicle speeds. The present invention will be more fully understood when the following portions of the specification are read in conjunction with the accompanying drawings wherein:

FIG. 1 is a fragmentary perspective view of an automotive vehicle mounting the improved wipers of the present invention;

FIG. 2 is an elevational view of the wiper of the present invention;

FIG. 3 is a view taken along line III—III of FIG. 2; and

FIG. 4 is a view taken along line IV—IV of FIG. 2.

In FIG. 1 an automotive vehicle 10 is shown having a windshield 11 mounted thereon in the conventional manner. Windshield 11 is of the curved type wherein the frontal area 12 is slightly curved and the outer lateral portions 13 are of greater curvature. A wiper motor 14 is mounted underneath the vehicle dashboard or on the firewall in a conventional manner. Motor 14 drives links 15 which are connected to crank arms 16 mounted on rockshafts 17 journaled in the cowl 18 of the vehicle. Wiper arms 19 are mounted on rockshafts 17 and in turn mount wipers 20 made in accordance with the present invention. The windshield 11 is of the type currently in vogue wherein the bottom-to-top dimension is relatively long, thus necessitating an elongated wiper to effect maximum clearance of foreign matter therefrom.

The elongated wiper 20 of the present invention includes a wiping element 21 made of rubber or any other suitable elastomeric material capable of providing a squeegeeing action on associated windshield 11. Wiper element 21 includes a central body portion 22 and has a lip portion 23 which engages the windshield. A neck 24 extends from the central body portion and merges into a head portion 25. Neck 24 is adapted to fit in slot 26 of flexible backing strip 27, slot 26 extending substantially throughout the length of the backing strip. Bridge members 28 are formed on the backing strip at select spaced intervals to enhance the lateral rigidity thereof without appreciably affecting the ability of the backing strip to flex toward and away from an associated windshield, as required. The wiping element 21 may be threaded into the backing strip in a manner disclosed in Patent No. 2,697,241, this feature not forming a part of the present invention. Backing strip 27 has end portions 29 spanning the slot 26 and abutting against the ends 30 of the wiping element to prevent separation of the wiping element and the backing strip during wiper operation.

A plurality of pressure equalizers 31, 32, and 33 are positioned on the backing strip 27. Equalizer 33 has fingers 34 formed at opposite ends thereof. These fingers are positioned along the edges of backing strip 27 and slidably engage the upper and lower faces of the backing strip. Pressure equalizers 31 and 32 have similar fingers, not numbered. Finger 35 of equalizer 31 fits within a notch 36 in backing strip 27 to hold the backing strip in assembly with the remainder of the structure. In lieu of such construction, a suitable construction may be provided, such as shown in application Serial No. 43,943, filed July 19, 1960, for permitting backing strip 27 carrying wiping element 21 to be slid from the pressure equalizers for replacement. As can be seen from FIG. 3, the body portion 37 of pressure equalizer 33 is of inverted channel shape and the corresponding body portions of pressure equalizers 31 and 32 are likewise. An intermediate pressure equalizer 38, which is of channel shape, has one end thereof formed into fingers 39 which engage notches 40 on opposite sides of the portion of pressure equalizer 32 between the ends thereof. The opposite end of the intermediate pressure equalizer 38 is formed into fingers 41 which fit into notches 42 in the portion of pressure equalizer 31 between the ends thereof. The areas of engagement between intermediate pressure equalizer 38 and pressure equalizers 31 and 32 do not necessarily have to be at the medial portion thereof but may be at any position which is required to obtain the desired pressure distribution. Fingers 39 and 41 are generally of the same configuration as shown relative to fingers 43 in FIG. 4 to be described hereafter. The fingers 39 and 41 in cooperation with their associated notches 40 and 42, respectively, permit pivotal movement of the pressure equalizers 31 and 32 relative to the intermediate pressure equalizer 38.

Lever 43' is provided having the lower end thereof formed into fingers 45 which cooperate with notches 46 located between the ends of pressure equalizer 33. This finger and notch structure is the same as described above with respect to finger-notch 39—40. The upper end of lever 43' is formed into fingers 43 (FIG. 4) which cooperate with notches 47 located between the ends of intermediate pressure equalizer 38 to permit pivotal movement between said intermediate pressure equalizer and lever. An arm attaching clip 49 is pivotally attached to lever 43' by pin 50 to receive the outer end of arm 19 to thus hold the wiper in position. The clip may be of the construction fully disclosed in Patent No. 2,807,822.

It can readily be seen that the pressure equalizers 31, 32, and 33 provide six areas for supporting the backing strip on each side thereof for a total of twelve areas of contact thereby distributing the arm pressure throughout the length of the wiper and, in addition, providing a number of supporting areas against lateral distortion of the wiper backing strip 27 during operation. Furthermore, the pivotal connection 43—47 between lever 43' and intermediate pressure equalizer 38 in combination with the pivotal connections 41—42 and 39—40 between the outer pressure equalizers 31 and 32 and intermediate pressure equalizer 38 provide for a floating movement of the outer portion of the wiper 20 to permit it to readily accommodate itself to the areas of the windshield which have the greatest amount of curvature. In other words, intermediate pressure equalizer 38 can pivot about fingers 43 and pressure equalizers 31 and 32 may pivot about fingers 41 and 39, respectively. The combined pivotal movement at all three points lends itself to ease of conformation of the wiper in a direction substantially normal to the windshield. Furthermore, notwithstanding the greater ease of flexing, there are approximately four areas of support for the backing strip in the upper half of the wiper, thereby eliminating large unsupported expenses which would permit lateral distortion of the backing strip. In other words, the additional areas of support are provided which are accommpanied by increased flexibility of the wiper assembly.

In addition, as can readily be seen from FIGS. 2 and 4, pressure equalizers 31 and 32 are adapted to nest within portions of intermediate pressure equalizer 38. Furthermore, portions of intermediate pressure equalizer 38 and pressure equalizer 33 are adapted to nest within lever 43'. The nesting of the above described elements of the superstructure increases the resistance of the wiper to windlift caused by rapidly moving air currents passing across the windshield. This nesting construction is especially desirable in longer wipers because of the increased area of the wipers which are exposed to the effect of the air currents. In other words, the nesting decreases the amount of area thus exposed and therefore reduces the tendency of the wipers to lift from the windshield.

It is to be further noted that windshield 11, in addition to having a relatively flat frontal area and more sharply curved lateral areas, also has a curved area adjacent the upper molding. Thus the upper ends of wipers 20 traverse the curved portion of the windshield adjacent the top molding before these portions pass onto the curved lateral parts of the windshield. The floating construction provided by the intermediate pressure equalizer 38 and pressure equalizers 31 and 32, as described above, enhances surface conformation of the outer ends of the wipers even though the configuration of the backing strip must be continuously varied as the wipers traverse these curved portions of the windshield.

It can thus be seen that the wiper of the present invention provides increased flexibility for good conformation to various areas of a curved windshield notwithstanding the increased number of support areas which are utilized to maintain it in good wiping contact with an associated windshield of a relatively long bottom-to-top dimension.

While a preferred embodiment of the present invention has been disclosed, it is to be understood that the present invention is not to be limited thereto, but may be otherwise embodied within the scope of the following claims.

What is claimed is:

1. An elongated wiper for a curved windshield having a frontal area which presents a relatively flat surface to a wiper and a lateral area which presents a relatively curved surface to a wiper comprising: a wiping element; a continuous resilient backing strip supporting said wiping element substantially throughout the length thereof; first, second, and third pressure equalizers each having opposite end portions, said pressure equalizers being spacedly positioned along the axis of said backing strip with adjacent end portions spaced a substantial distance from each other so that the portion of said wiping element between said adjacent end portions is supported solely by said backing strip to thereby permit movement of each of said end portions relative to an adjacent end portion without effecting substantial movement of said adjacent end portions, certain of said end portions slidably engaging select spaced portions of said backing strip and one of said end portions of said pressure equalizers connected to said backing strip to thereby provide six spaced areas of contact with said backing strip; said slidable engagement of said end portions in combination with said substantial spacing between said adjacent end portions permiting said wiping element to conform closely to various areas of said curved windshield; an intermediate pressure equalizer pivotally mounted at the opposite ends thereof on said first and second pressure equalizers; a lever mounted at one end thereof on said third pressure equalizer and pivotally mounted at the opposite end thereof on said intermediate pressure equalizer; mounting means on said lever for receiving the outer end of a wiper arm; said pivotal connection between said lever and said intermediate pressure equalizer and said pivotal connections between said intermediate pressure equalizer and said first and second levers providing a floating action for permitting the outer end of said wiper to readily conform to said relatively curved lateral surface area of said windshield.

2. An elongated wiper for a curved windshield comprising a wiping element, a continuous resilient backing strip mounting said wiping element, three longitudinally spaced pressure equalizers having end portions, certain of said end portions of said pressure equalizers slidably engaging said backing strip, said end portions of each of said pressure equalizers being spaced a substantial distance from an adjacent end portion of an adjacent pressure equalizer so that the portion of said wiping element between adjacent end portions is supported solely by said backing strip to thereby permit movement of each of said end portions relative to an adjacent end portion without effecting movement of said adjacent end portions, said slidable engagement between said pressure equalizers and said backing strip in combination with said substantial spacing permitting said wiping element to conform readily to various portions of said curved windshield, and one of said end portions of said pressure equalizers connected to said backing strip, an intermediate pressure equalizer pivotally connected at its opposite ends to first and second of said pressure equalizers between the ends thereof, and a lever having one end thereof pivotally connected between the ends of said intermediate pressure equalizer and the other end thereof between the ends of a third pressure equalizer, and mounting means on said lever for receiving the outer end of a wiper arm whereby the pressure from said wiper arm can be distributed to six spaced areas on said backing strip to cause the backing strip to follow the contour of said windshield by flexing relative to the windshield, said support provided at said six spaced areas stabilizing said backing strip against excessive lateral distortion.

3. An elongated wiper for a curved windshield having a frontal area which presents a relatively flat surface to a wiper and a lateral area which presents a relatively curved surface to a wiper comprising a wiping element, a continuous resilient backing strip mounting said wiping element, three pressure equalizers spaced along the longitudinal axis of said backing strip, said pressure equalizers having end portions, certain of said end portions slidably engaging said backing strip, and one of said end portions being connected to said backing strip, said end portions of adjacent pressure equalizers being spaced a substantial distance apart so that the portion of said wiping element between said adjacent end portions is supported solely by said backing strip between said adjacent end portions to thereby permit movement of an end portion relative to an adjacent end portion without effecting movement of said adjacent end portion, said slidable engagement in combination with said substantial spacing permitting good conforming action of said wiping element with said variously curved portions of said windshield, an intermediate pressure equalizer pivotally connected at its opposite ends to portions of first and second of said pressure equalizers, a lever having one end thereof pivotally connected to said intermediate pressure equalizer and the other end thereof to a third pressure equalizer, said third pressure equalizer being positioned substantially throughout oscillation of said wiper on the relatively flat frontal portion of the windshield and the portion of said wiping element extending outwardly of the pivotal connection between said lever and said intermediate pressure equalizer being adapted to traverse the lateral portion of the windshield which is relatively curved, and mounting means on said lever for receiving the outer end of a wiper arm whereby the pressure from said wiper arm can be distributed to at least six spaced areas on said backing strip to thereby cause said backing strip to follow the contour of said windshield, said support provided at at least six spaced areas stabilizing said backing strip of said elongated wiper against excessive lateral distortion.

4. An elongated wiper for a curved windshield having a frontal area which presents a relatively flat surface to a wiper and a lateral area which presents a relatively curved surface to a wiper comprising a wiping element, a continuous resilient backing strip mounting said wiping element, three pressure equalizers spaced along the longitudinal axis of said backing strip, said pressure equalizers having end portions, certain of said end portions slidably engaging said backing strip and one of said end portions being connected to said backing strip, said end portions of adjacent pressure equalizers being spaced a substantial distance apart so that the portion of said wiping element between said adjacent end portions is supported solely by said backing strip between said adjacent end portions to thereby permit movement of an end portion relative to an adjacent end portion without effecting movement of said adjacent end portion, said slidable engagement in combination with said substantial spacing permitting good conforming action of said wiping element with said variously curved portions of said windshield, an intermediate pressure equalizer pivotally connected at its opposite ends to first and second of said pressure equalizers, a lever having one end thereof pivotally connected to said intermediate pressure equalizer and the other end thereof to a third pressure equalizer, the portion of said wiping element extending outwardly of the pivotal connection between said lever and said intermediate pressure equalizer adapted to traverse the lateral portion of the windshield which is relatively curved, portions of said first and second equalizers being adapted to nest within a portion of said intermediate pressure equalizer and a portion of said intermediate pressure equalizer being adapted to nest within a portion of said lever to thereby provide a relatively low silhouette to said wiper, and mounting means on said lever for receiving the outer end of a wiper arm whereby the pressure from said wiper arm can be distributed to at least six spaced areas on said backing strip by said pressure equalizers to thereby cause said backing strip to follow the contour of said windshield, said support provided at at least six spaced areas stabilizing said backing strip of said elongated wiper against excessive lateral distortion.

5. An elongated wiper for a curved windshield having a frontal area which presents a relatively flat surface to a wiper and a lateral area which presents a relatively curved surface to a wiper comprising: a wiping element; a continuous resilient backing strip supporting said wiping element substantially throughout the length thereof; first, second, and third pressure equalizers spacedly positioned along the axis of said backing strip and having fingers at opposite ends thereof for grasping the opposite side margins of said backing strip and engaging the upper and lower faces thereof to provide six spaced areas of contact with said backing strip, said end portions of adjacent pressure equalizers being spaced a substantial distance apart so that the portion of said wiping element between said adjacent end portions is supported solely by said backing strip between said adjacent end portions to thereby permit movement of an end portion relative to an adjacent end portion without effecting movement of said adjacent end portion, said slidable engagement in combination with said substantial spacing permitting good conforming action of said wiping element with said variously curved portions of said windshield; an intermediate pressure equalizer pivotally mounted at the opposite ends thereof on said first and second pressure equalizers; a lever pivotally mounted at one end thereof on said third pressure equalizer and pivotally mounted at the opposite end thereof on said intermediate pressure equalizers; portions of said first and second pressure equalizers being adapted to nest within portions of said intermediate pressure equalizer, and portions of said intermediate pressure equalizer and said third pressure equalizer being adapted to nest within portions of said lever; mounting means on said lever for receiving the outer end of a wiper arm; said pivotal connection between said lever and said intermediate pressure equalizer and said pivotal connections between said intermediate pressure equalizer and said first and second levers providing a floating action for permitting the outer end of said wiper to readily conform to said relatively curved lateral surface area of said windshield.

References Cited in the file of this patent

UNITED STATES PATENTS

| | | |
|---|---|---|
| 2,807,821 | Scinta | Oct. 1, 1957 |
| 2,859,468 | O'Shei | Nov. 11, 1958 |
| 2,876,482 | Oishei | Mar. 10, 1959 |